US009476399B1

(12) United States Patent
Munson

(10) Patent No.: US 9,476,399 B1
(45) Date of Patent: Oct. 25, 2016

(54) GLOW PLUG TYPE ACOUSTIC RESONANCE IGNITER

(71) Applicant: Scott M. Munson, Monona, WI (US)

(72) Inventor: Scott M. Munson, Monona, WI (US)

(73) Assignee: Orbital Technologies Corporation, Madison, WI (US)

( * ) Notice: Subject to any disclaimer, the term of this patent is extended or adjusted under 35 U.S.C. 154(b) by 683 days.

(21) Appl. No.: 13/894,919

(22) Filed: May 15, 2013

Related U.S. Application Data

(60) Provisional application No. 61/647,696, filed on May 16, 2012.

(51) Int. Cl.
F02P 23/00 (2006.01)
F02P 3/12 (2006.01)

(52) U.S. Cl.
CPC .................................... F02P 23/00 (2013.01)

(58) Field of Classification Search
CPC ............ F02K 9/76; F02K 9/766; F02K 9/78; F02K 9/18; F02K 9/62; F02K 9/64; F02K 9/42; F02K 9/72; F02K 9/94; F02K 9/95; F02C 7/26; F02C 7/264; F02P 23/00; F02P 3/12
See application file for complete search history.

(56) References Cited

U.S. PATENT DOCUMENTS

| 3,630,151 A | 12/1971 | Rakowsky |
| 3,811,359 A | 5/1974 | Marchese et al. |
| 3,982,488 A | 9/1976 | Rakowsky et al. |
| 5,109,669 A | 5/1992 | Morris et al. |
| 6,199,370 B1 | 3/2001 | Kessaev et al. |
| 6,272,845 B2 * | 8/2001 | Kessaev .......................... 60/212 |
| 6,966,769 B2 | 11/2005 | Elvander et al. |
| 6,969,251 B2 | 11/2005 | Stalder et al. |
| 7,096,670 B2 | 8/2006 | Joos et al. |
| 7,565,795 B1 | 7/2009 | Horn et al. |
| 8,966,879 B1 * | 3/2015 | Munson ................... F02K 9/95 60/200.1 |
| 2005/0053876 A1 | 3/2005 | Joos et al. |
| 2008/0299504 A1 | 12/2008 | Horn |
| 2009/0173321 A1 | 7/2009 | Horn et al. |

FOREIGN PATENT DOCUMENTS

| CN | 101782028 A | 7/2010 |
| SU | 1537967 A1 | 1/1990 |

OTHER PUBLICATIONS

Guoping Xia, Ding Li, and Charles L. Merkle, "Effects of a Needle on Shrouded Hartmann-Sprenger Tube Flows", AIAA Journal, vol. 45, No. 5, May 2007.

(Continued)

Primary Examiner — Craig Kim
(74) Attorney, Agent, or Firm — Stiennon & Stiennon

(57) ABSTRACT

An acoustic resonance igniter uses high-pressure helium to heat a resonance cavity so a hot surface of the resonance cavity forms a source of ignition to a combustion chamber. The resonance cavity may be round or may extend linearly to increase the size of the hot surface. The combustion chamber is cooled by arranging a feed of hydrogen and oxygen which is oxygen rich and which becomes more so when ignition occurs. A second combustion chamber receives the combustion chamber output and adds additional hydrogen through ports tangential to the wall of the second combustion chamber to enrich the fuel ratio and cool the second combustion chamber. The acoustic resonance igniter is used to ignite a large rocket engine or to form a rocket thruster.

20 Claims, 2 Drawing Sheets

(56) References Cited

OTHER PUBLICATIONS

Bert R. Phillips and Albert J. Pavli, "Resonance Tube Ignition of Hydrogen-Oxygen Mixtures", NASA Technical Note, May 1971, NASA TN D-6354.

Mario Niwa, A. Santana, Jr., and Khoze Kessaev, Development of a Resonance Igniter for GO2/Kerosene Ignition, Journal of Propulsion and Power, vol. 17, No. 5, Sep.-Oct. 2001.

K. Kessaev, R. Vidal, M. Niwa, "Gas Jet Heat Release Inside a Cylindrical Cavity", International Journal of Heat and Mass Transfer, Aug. 14, 2002.

C.K.W. Tam and H.K. Tanna, "Shock Associated Noise of Supersonic Jets from Convergent-Divergent Nozzles", Journal of Sound and Vibration, Academic Press Inc., (London) Limited, 1982.

P. J. Robinson and E. M. Veith, "Development of a Flight-Type Exciter for a Spark-Initiated Torch Igniter", NASA Johnson Space Center, Abstract No. 2008-0128AFE.

Guo-Zhou Zhang, Ya-Na Song, Nan-Jia Yu, Xiao-Yan Tong, and Bin Ma, "Coaxial Hydrogen/Oxygen Gas-Dynamic Resonance Ignition Technology for Rocket Repetitive Starting", Beijing University of Aeronautics and Astronautics.

V. P. Marchese and E. L. Rakowsky, L. J. Bement "A Fluidic Sounding Rocket Motor Ignition System", J. Spacecraft, vol. 10, No. 11, Nov. 1973.

Resonance Ignition diagrams and photographs from the Institute of Space Propulsion.

Article entitled "Thrust Chambers and Other Combustion Devices", p. 125.

Bert Phillips, Albert J. Pavli, and E. William Conrad, "A Resonance Igniter for Hydrogen-Oxygen Combustors", J. Spacecraft, vol. 7, No. 8, pp. 620-622, Feb. 13, 1970.

S. Murugappan and E. Gutmark, "Parametric Study of Hartmann-Sprenger Tube", p. 1, AIAA-2002-1012.

AF-M315A Resonant Igniter Ignition Tests.

Nicholas Pearson and William E. Anderson, "Acoustic Response of a Resonant Igniter with Confuser Inlet", Purdue University.

Dustin J. Bouch and A. D. Cutler, "Investigation of a Hartmann-Sprenger Tube for Passive Heating of Scramjet Injectant Gases", AIAA-2003-1275.

A. Hamed, K. Das and D. Basu, "Numerical Simulation and Parametric Study of Hartmann-Sprenger Tube Based Powered Device", AIAA-2003-0550.

M. Niwa, A. Santana, Jr., and K. Kessaev, "Modular Ignition System Based on Resonance Igniter", J. Propulsion, vol. 17, No. 5 pp. 1131-1133.

C. E. G. Przirembel, "Aerothermodynamic Aspects of an Axisymmetric Resonance Tube", AIAA Journal, vol. 18, No. 9, Sep. 1980, pp. 1141-1143.

C. E. G. Przirembel and L. S. Fletcher, "Aerothermodynamics of a Simple Resonance Tube", AIAA Journal, vol. 15, No. 1, Jan. 1977, pp. 101-104.

Vladimir Bazarov, Vladimir Rutovskii and Anton Khohlov, "Study of Atomization, Mixing and Combustion of Liquid and Gaseous Propellants in Crossed and Swirled Flows", 43rd AIAA/ASME/SAE/ASEE Joint Propulsion Conference & Exhibit, Jul. 8-11, 2007, p. 1.

Kevin Miller, James Sisco, Nicholas Nugent, and William Anderson, Experimental Study of Combustion Instabilities in a Single-Element Coaxial Swirl Injector 41st AIAA.SME.SAE.ASEE joint Propulsion Conference & Exhibit, Jul. 10-13, 2005, pp. 1-15.

Julian Becker, "Breakup and Atomization of a Kerosene Jet in Crossflow at Elevated Pressure", Journal of the International Institutions for Liquid Atomization and Spray Systems, vol. 12, No. 1-3, pp. 363-383, 2002.

R. K. Cohn, P. A. Strakey, R. W. Bates and D. G. Talley, "Swirl coaxial Injector Development", 41st Aerospace Sciences Meeting and Exhibit, Jan. 6-9, 2003.

Matthew R. Long, Vladimir G. Bazarov, and William E. Anderson, "Main Chamber Injectors for Advanced Hydrocarbon booster Engines", 39th AIAA/ASME/SAE/ASEE Joint Propulsion Conference and Exhibit, Jul. 20-23, 2003.

S. Pal, M. D. Moser, H. M. Ryan, M. J. Foust and R. J. Santoro, "Shear Coaxial Injector Atomization Phenomena for Combusting and Non-Combusting Conditions", NASA-CR-193339.

Nicholas Pearson and William E. Anderson, "Acoustic Response of a Resonant Igniter with Confuser Inlet", AIAA Journal, vol. 46, No. 4, Apr. 2008.

Vincent P. Marchese, "Development and Demonstration of Flueric Sounding Rocket Motor Ignition", NASA-CR-2418, Jun. 1974.

James M. Green, "A Premixed Hydrogen/Oxygen Catalytic Igniter", NASA-CR-185113, AIAA-89/2302, Jun. 1989.

M. Kurosaka, "Acoustic Streaming in Swirling Flow and the Ranque-Hilsch (vortex-tube) Effect", J. Fluid Mech., vol. 124, pp. 139-172, 1982.

L. Stabinsky, "Analytical and Experimental Study of Resonance Ignition Tubes" NASA CR 136934, Dec. 1, 1973, pp. 13-39.

U.S. Appl. No. 13/396,919, filed Feb. 15, 2012.

Chapter 3, "Hydrogen Ignition", by S. Hawksworth, downloaded, May 8, 2012.

* cited by examiner

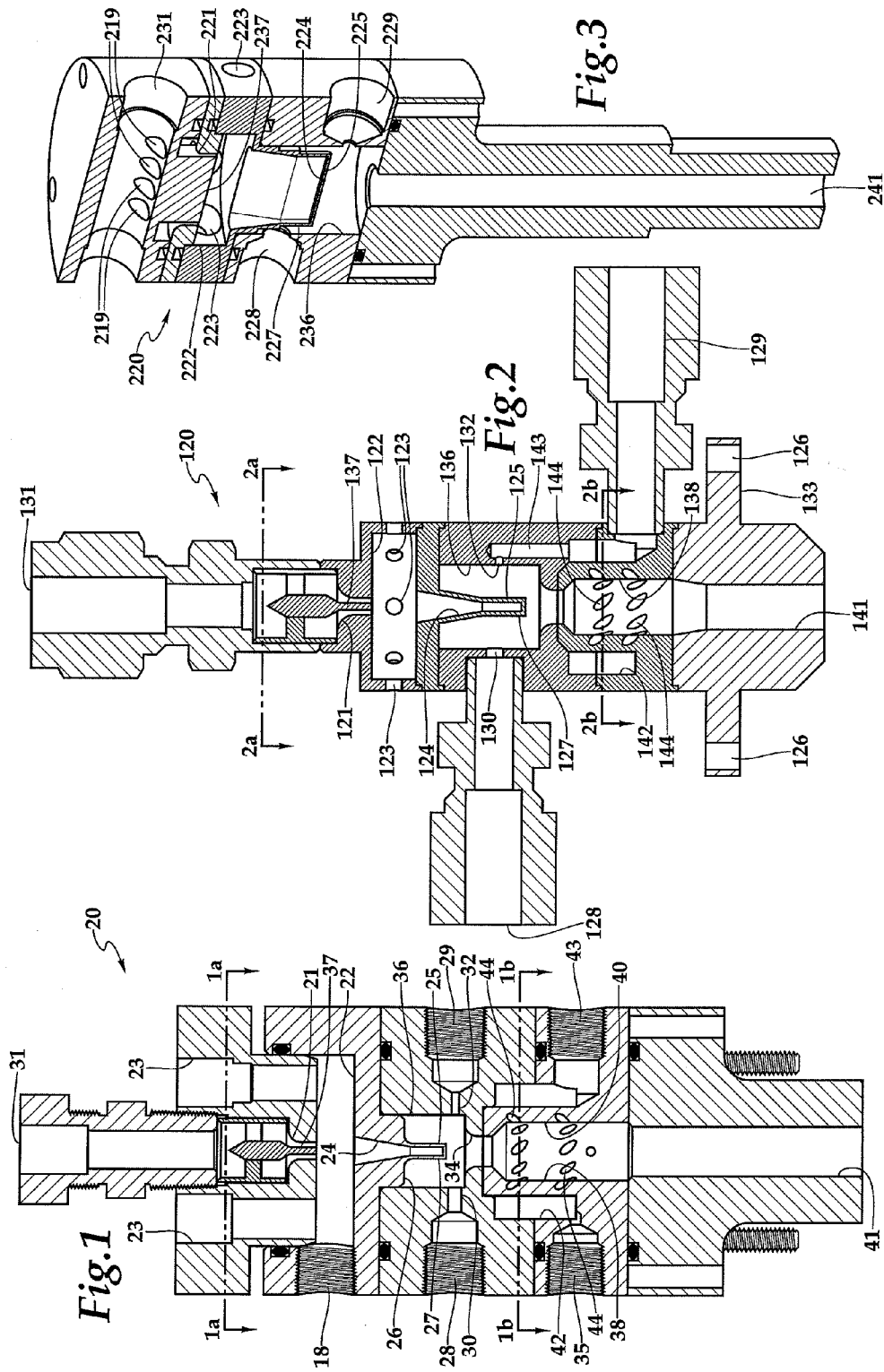

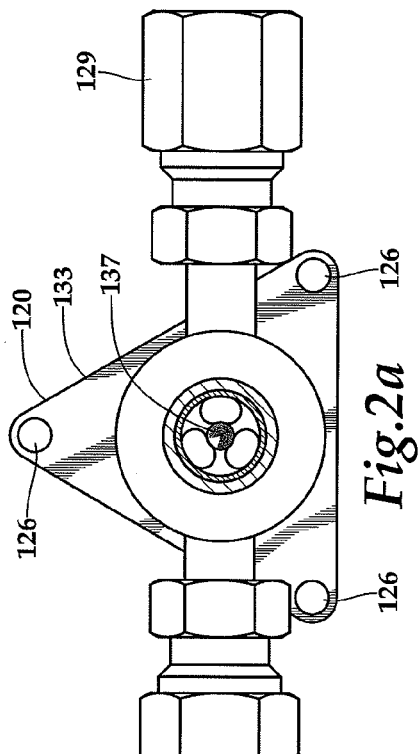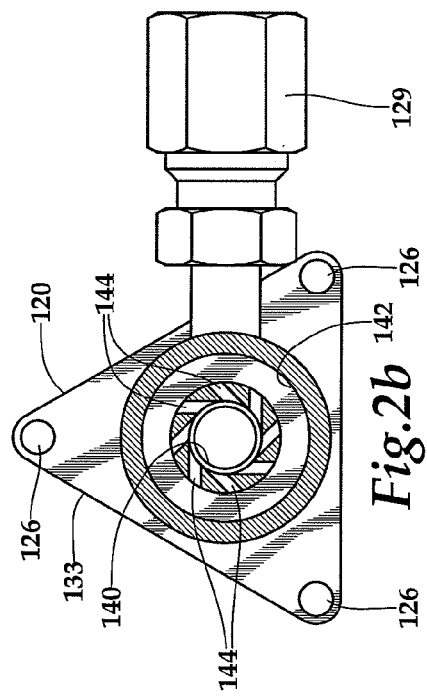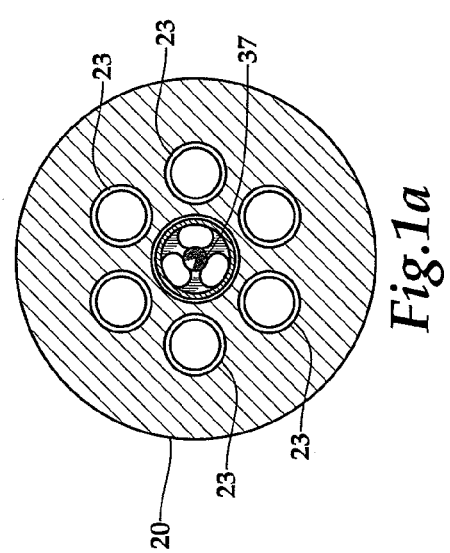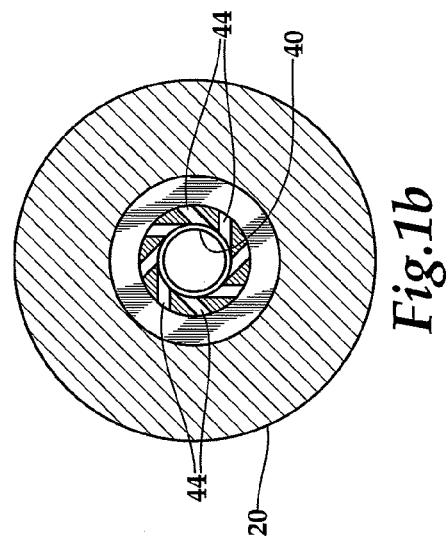

GLOW PLUG TYPE ACOUSTIC RESONANCE IGNITER

CROSS REFERENCES TO RELATED APPLICATIONS

This application claims priority on U.S. Provisional Patent App. No. 61/647,696 Filed May 16, 2012, the disclosure of which is incorporated by reference herein.

STATEMENT AS TO RIGHTS TO INVENTIONS MADE UNDER FEDERALLY SPONSORED RESEARCH AND DEVELOPMENT

This invention was made with government support under contract to US Air Force Research Laboratory # FA9300-10-C-2105. The government has certain rights in the invention. The government may exercise such rights over assignee's objection in accordance with 35 U.S.C. 202 and 203 if the government finds such action necessary in accord with 35 U.S.C. 203(a)(1-4).

BACKGROUND OF THE INVENTION

The present invention relates to igniters such as are used in rocket engines, jet engines and combustors in general; and to igniters utilizing a hot surface, heated by acoustically heated gas, as an ignition source in particular.

Generally the safest, most reliable and most widely used method of igniting a combustor which does not employ a pilot light is an electrical spark. This approach is generally reliable and safe, e.g., such as used in an internal combustion engine spark plug. Historically, however, igniters for rocket engines have often used a pyrotechnic igniter or hypergolic ignition to assure reliable engine ignition. Ignition is particularly a concern in liquid rocket engines where both the fuel and oxidizer are supplied as liquids to the chamber, because any momentary delay in ignition can result in the accumulation of an explosive mixture of fuel and oxidizer, resulting in a hard start which may damage or destroy the engine. Restartable rocket engines are often necessary where the engine is used to perform orbit circularization, orbital maneuvers, or orbital transfer. Multiple pyrotechnic igniters, one for each use of the engine, have been used. Reusable engines also require multiple starts, and, while replaceable pyrotechnic igniters are possible, they may leave residues which may add to the cost of reconditioning the engine for re-flight. Another approach to reliable ignition is to use propellants which are hypergolic (ignite on contact with each other) so that multiple restarts of the engine are not generally a problem. Hypergolic fuel combinations are widely used in rocket engines employed in missiles, rocket boosters, and/or maneuvering engines, in large part because they provide a simple and reliable ignition process. Non-hypergolic propellant combinations in rocket booster stages often use a limited quantity or slug of hypergolic propellant in one or both of the propellant lines or are separately injected into the combustion chamber to initiate combustion. In such a case multiple starts become complicated. Although engines utilizing hypergolic propellants readily perform multiple restarts and are widely used, using hypergolic propellant combinations limits propellant choice and can limit performance. Moreover, generally hypergolic propellants are themselves expensive and toxic, such that the cost of procurement and handling may be significantly increased as compared to non-hypergolic propellants.

Electric spark ignition has been used to overcome these problems particularly with the hydrogen and oxygen propellant combination such as on the Pratt & Whitney RL 10 engine. Hydrogen and oxygen are clean burning, require low ignition energy, and have wide flammability limits. However, electrical ignition sources add complexity, require electrical power and a high-voltage electrical source, and are susceptible to electromagnetic damage such as caused by lightning strikes, and generally provide low ignition energy.

One possible ignition source which has been considered particularly for hydrogen and oxygen propellants is an acoustic igniter. An acoustic igniter employs a nozzle which directs an under-expanded sonic or supersonic gas jet into an essentially blind hole which forms an acoustic resonance tube. This arrangement, originally used as a high frequency noise source, was subsequently investigated as a simple way of obtaining a small quantity of very hot gas, or a hot surface which can be used as a source of ignition.

What is needed is a practical acoustic resonance igniter for $H_2$ and $O_2$, particularly with relatively low pressure gasses.

SUMMARY OF THE INVENTION

The acoustic resonance igniter of this invention uses a high-pressure driver gas to heat a resonance cavity to a high temperature so the hot surface of the resonance cavity acts in the manner of a glow plug. An oxygen manifold supplies a primary combustion chamber of oxygen at a first regulated pressure, and hydrogen is supplied to the combustion chamber by a hydrogen manifold at a second regulated pressure which is lower than the oxygen manifold pressure. The primary combustion chamber exhausts through an exhaust orifice into a secondary combustion chamber, such that the pressure in the primary combustion chamber is governed by the pressure of the primary oxygen manifold, the size of the oxygen inlet port to the primary combustion chamber, and a manifold pressure of the primary hydrogen manifold and the size of the hydrogen inlet port to the primary combustion chamber, and finally by the size of the exhaust port orifice.

The primary hydrogen manifold and inlet port and the primary oxygen manifold and inlet port are arranged such that they have a high oxygen/fuel mixture ratio, for example 33, which is near the minimum energy for ignition of hydrogen and oxygen. The manifolds and the inlets are further arranged such that combustion in the primary combustion chamber drives the mixture ratio to a higher mixture ratio, for example 100, so that the combustion gases temperature reduce or eliminate the need for cooling of the primary combustion chamber. The highly oxygen rich combustion gases exit the primary combustion chamber through the exhaust orifice into the secondary combustion chamber where the temperature of the combustion gases is raised by the injection of additional hydrogen through the hydrogen manifold. The manifold forms an annulus around the secondary chamber and has inlet ports which are drilled at an angle, as shown in FIG. 1, so that the secondary hydrogen enters the combustion chamber through injection ports which are arranged to inject the hydrogen tangentially to the inside cylindrical wall of the secondary combustion chamber.

Operation in a typical sequence is by starting helium flowing through the sonic nozzle and into the resonance cavity, after which the helium is exhausted out through one or more exhaust ports. After some short interval of heating, the exterior of the resonance cavity will be in excess of 1500° K (1230° C., 2246° F.), well above the autoignition temperature for $H_2$ and $O_2$ gas. After the short heating interval, the main propellant valves are opened, first $H_2$ then $O_2$. Under cold-flow conditions, the mixture ratio in the primary combustion chamber is approximately 33, which is near the mixture ratio (O/F) of minimum ignition energy. Once combustion occurs in the primary chamber, a pressure drop will occur across the primary chamber throat and the mixture ratio in the region adjacent to the resonance cavity will rise to approximately 100. This mixture ratio will result in a much cooler flame temperature in the primary combustion chamber, thus enhancing the hardware survivability. In the secondary combustion chamber, the secondary hydrogen will be injected to trim out the mixture ratio to an O/F of approximately 1.5. Additionally, this secondary fuel is injected in a swirling pattern to provide film cooling to the rest of the igniter and transfer tube.

It is a feature of the invention to provide for ignition of low-pressure hydrogen and oxygen with high-pressure helium in a glow plug type acoustic resonance igniter.

Further objects, features and advantages of the invention will be apparent from the following detailed description when taken in conjunction with the accompanying drawings.

BRIEF DESCRIPTION OF THE DRAWINGS

FIG. 1 is a front elevational cross-sectional view of a test configuration of the ignitor of this invention.

FIG. 1a is a cross-sectional view of the apparatus of FIG. 1 taken along line 1a-1a.

FIG. 1b is a cross-sectional view of the apparatus of FIG. 1 taken along line 1b-1b.

FIG. 2 is a front elevational cross-sectional view of a flight weight configuration of the ignitor of this invention.

FIG. 2a is a cross-sectional view of the apparatus of FIG. 2 taken along line 2a-2a.

FIG. 2b is a cross-sectional view of the apparatus of FIG. 2 taken along line 2b-2b.

FIG. 3 is a cut-away isometric view of an alternative embodiment of the ignitor of this invention, where a linear nozzle and linear resonance cavity are employed.

DESCRIPTION OF THE PREFERRED EMBODIMENTS

Referring more particularly to FIGS. 1-3, wherein like numbers refer to similar parts, a glow plug type acoustic resonance igniter 20 is shown in FIG. 1. The igniter 20 of FIG. 1 is a laboratory test article. A flight weight igniter 120 is shown in FIG. 2, and an alternative embodiment linear igniter 220 is shown in FIG. 3.

The resonance igniter 20 shown in FIG. 1 employs a high-pressure helium source 31, for example helium at 200-620 psia, which is accelerated through a sonic nozzle 21 into a lower pressure chamber 22 at, for example, 60 psia. A pintle 37 is mounted in the nozzle 21 to improve flow characteristics. A pressure test port 18 is shown in FIG. 1 for measuring pressure in the lower pressure chamber 22. The pressure in the lower pressure chamber 22 is maintained by outlets 23. The outlets form choked flow nozzles, whose outflows depend only upon the helium temperature and pressure but not on the external pressure to which the helium outlets 23 exhaust. Opposite the sonic nozzle 21 is a resonance cavity 24 similar to that described in U.S. application Ser. No. 13/396,919, filed on Feb. 15, 2012, which is incorporated herein by reference.

As described therein the resonance cavity 24 is arranged so that a sonic resonance wave is set up in the cavity which results in heating of the helium gas, particularly in the lowermost cylindrical portion 27 of the cavity. The resonance cavity 24 is shown as formed in part of a structural component 26 which also defines the lower portion of the pressure chamber 22. One possible material for forming the resonance cavity 24 is a molybdenum alloy such as TZM Molybdenum ASTM B386 type 364 (Alloy Plate, Sheet, Strip, and Foil) and B387 type 364 (Alloy Bar, Rod, and Wire) an alloy of 0.50% Titanium, 0.08% Zirconium and 0.02% Carbon with the balance Molybdenum.

After some short interval of heating, the exterior of the resonance cavity 24, i.e., the hot surface 25, will be in excess of 1500° K (1230° C., 2246° F.), well above the autoignition temperature for $H_2$ and $O_2$ gas. The inlet manifold for oxygen 28 and the inlet manifold for hydrogen 29 are arranged with manifold pressures and the inlet orifices 30, 32 together with the exhaust orifice, and flow channel 34 such that the primary combustion chamber 36 has a high oxidizer rich mixture ratio, for example 33:1, which is near optimal, i.e., minimum energy for ignition from the hot surface 25 of the surrounding lower cylindrical portion 27 of the resonance cavity. The arrangement of manifold pressures and orifice sizes are preferably arranged such that when the oxygen and hydrogen ignite, increasing the volume of the gases in the primary combustion chamber 36, the mixture ratio becomes, with or without active control, even more oxygen-rich, for example 100:1, so as to minimize heating in the primary combustion chamber 36 and the exhaust orifice 34. The exhaust orifice 34 does not generally operate with a choked flow (i.e., does not operate such that downstream conditions do affect the pressure in the primary combustion chamber).

To increase the flame temperature of the combustion gases from the primary combustion chamber 36, secondary hydrogen from an inlet 35 is added to the combustion gases in a secondary combustion chamber 38 into which the exhaust orifice 34 empties. Sufficient hydrogen to substantially lower the mixture ratio, for example to produce a mixture ratio of 1.5:1, is used to increase the energy of the combustion gases to produce a suitable torch for igniting the combustion chamber of a larger engine. To raise the energy of the combustion gases without overheating the walls 40 of the secondary combustion chamber, the secondary hydrogen gas from an inlet 43 is introduced through an annular manifold 42 which surrounds the secondary combustion chamber walls 40. The annular manifold 42 introduction is arranged so as to cool the secondary combustion chamber walls 40. The cooling injection the secondary combustion chamber walls 40 is arranged through ports 44 which are drilled through the chamber walls 40, best shown in FIG. 1b between the annular manifold 42 and the secondary combustion chamber, so that rows of holes, i.e., injection ports 44, enter the secondary combustion chamber at tangents to the inner cylindrical wall 40 of the combustion chamber and downwardly at a 45° angle with respect to an axis defined by the cylindrical chamber wall 40. The secondary hydrogen enters along the wall 40 of the combustion chamber 38 so as to induce rotation of the injected hydrogen to produce a shield of hydrogen gas around the secondary combustion chamber wall 40, and the transfer tube 41 to the larger oxygen-hydrogen engine (not shown).

The acoustic resonance igniters 20, 120 are configured to provide positive mixture ratio control during and after the ignition transient, either passively through the selection of the regulated gas pressures and orifices 30, 32, 130, 132 or actively by varying gas pressures and flows.

The "glow plug"-style resonance cavity device, i.e., the resonance cavity 24, is located inside a primary combustion chamber 36 which is located upstream of a secondary combustion chamber 38. All the oxidizer and a portion of the fuel is injected into the primary combustion chamber 36. The primary propellants flow from the primary combustion chamber 36 through an unchoked orifice 34 into the secondary combustion chamber 38 where the balance of the fuel is injected. The propellant manifolds are kept at constant pressure through the use of pressure regulators in the propellant feed systems upstream of the igniter i.e., the hot surface 25. The orifice between the primary 36 and secondary 38 combustion chambers serves to create a differential injection back pressure between the primary fuel injector and the secondary fuel injector. Prior to ignition, the mixture ratio (O/F) of the primary combustion chamber is approximately 30:1-40:1 (which is easily ignitable) and the mixture ratio of the secondary combustion chamber is approximately 1.0:1-1.2:1. After ignition, the pressure in both combustion chambers increases and the pressure drop through the inter-chamber orifice 34 increases as well. The post-ignition mixture ratio in the primary combustion chamber is approximately 100:1-120:1 (which results in a cooler flame temperature) and the mixture ratio in the secondary combustion chamber is approximately 1.4:1-1.6:1 resulting in a higher flame temperature. The igniter exhaust nozzle 41 exhausts to a near-vacuum prior to ignition. After ignition, the igniter exhausts into a rocket engine main combustion chamber that reaches pressures of up to 2000 psia. As the main combustion chamber pressure is elevated, the igniter manifold pressures are elevated accordingly, stopping the flow of gas to the primary 36 and secondary 38 combustion chambers. With ignition of the engine the flow of helium hydrogen and oxygen to the plug type acoustic resonance igniter 20 is shut down The major sub-scale operating parameters of the acoustic resonance igniter illustrated and described with respect to FIG. 1 are listed in the table below:

|  | Pre-Ignition | Post-Ignition |  |
| --- | --- | --- | --- |
| Oxygen Injector | | | |
| Oxygen Manifold Inlet Area | 0.0254 | 0.0254 | in$^2$ |
| Oxygen Manifold Pressure | 40 | 40 | psia |
| Oxygen Injector Diameter | 0.076 | 0.076 | in |
| Oxygen Mass Flow Rate | 0.00460 | 0.00320 | lb$_m$/sec |
| Hydrogen Injectors | | | |
| Hydrogen Manifold Pressure | 30 | 30 | psia |
| Primary H$_2$ Injector Diameter | 0.033 | 0.033 | in |
| Primary H$_2$ Injector Flow Rate | 0.00014 | 0.00003 | lb$_m$/sec |
| Hydrogen Trim Injector Diameter | 0.041 | 0.041 | in |
| Hydrogen Trim Injector Num. | 16 | 16 | — |
| Hydrogen Trim Flow Rate | 0.00402 | 0.00216 | lb$_m$/sec |
| Primary Chamber | | | |
| Primary Mixture Ratio | 33 | 101 | — |
| Primary Chamber Temperature | 300 | 1620 | K |
| Primary Chamber Pressure | 18.7 | 30.0 | psia |
| Primary Chamber Throat Diameter | 0.15 | 0.15 | in |
| Primary Chamber Throat Area | 0.0177 | 0.0177 | in$^2$ |
| Primary Mass Flow Rate | 0.00474 | 0.00323 | lb$_m$/sec |
| Primary Chamber Throat ΔP | 4.8 | 4.7 | psid |
| Secondary Chamber | | | |
| Global Mixture Ratio | 1.1 | 1.5 | — |
| Global C* | N/A | 8213 | ft/sec |
| Global T$_{Ad}$ | 300 | 1668 | K |
| Total Mass Flow Rate | 0.00876 | 0.00540 | lb$_m$/sec |
| Secondary Chamber Pressure | 13.8 | 26.3 | psia |
| Nozzle | | | |
| Nozzle Throat Diameter | 0.258 | 0.258 | in |
| Nozzle Throat Area | 0.0523 | 0.0523 | in$^2$ |

A flight weight arrangement of the plug type acoustical resonance igniter 120, is shown in FIG. 2. The primary differences over the igniter 20 is the use of braze joints for assembly to reduce weight, and the use of a single gas hydrogen inlet 129 which connects to the hydrogen manifold 142 which in turn is connected through a passageway 143 and an orifice 132, which feeds the primary combustion chamber 136. The gaseous oxygen source 128 at about 30 psi is supplied to the primary combustion chamber 136 through an inlet orifice 130. The igniter 120 has cooling injection holes 144, and combustion gases exhaust though nozzle 141.

An additional feature is that helium exhaust outlets 123 are arranged to exit radially from a lower pressure chamber 122 through which helium exits, the outlets 123 form a plurality of choked flow exhaust outlets in the igniter 120.

The flight weight arrangement of the plug type acoustical resonance igniter 120 incorporates, a helium inlet 131, and hot surface 125 of a lower cylindrical part 127 of the resonance cavity 124. The resonance igniter 120 also has a mounting flange 133 with three holes 126 for receiving mounting fasteners (not shown) which mount the igniter 120 to a combustion chamber (not shown).

Ignition of hydrogen and oxygen requires a certain amount of the heated gases to reach the autoignition temperature. In such a situation the temperature of the hot surface, the area of the hot surface, and the velocity of the gases passing by the hot surface will all affect the ability and speed at which the hot surface igniter ignites the gases.

Shown in FIG. 3 is an acoustic resonance igniter 220 arranged to increase the size of the heated surface 225 by arranging a resonance cavity 224 which extends linearly a selected distance e.g., 0.080 to 1.000 inches, across a primary combustion chamber 236. The linear extension forms resonance cavities 224 for example of 0.040"×0.500" up to 0.080"×1.000". The liner resonance cavity 224 is fed by a linear jet of helium. The linear jet of helium is formed by helium from the inlet 231 at a pressure of about 200-620 psia which feeds a plurality of inlets 219 on both sides of a linear pintle 237, centered in a linear sonic nozzle 221. The pintle is similar to the pintles 37, 137 but is linearly extended as shown in FIG. 3. The helium exhaust outlets 223 are arranged to exit radially from a lower pressure chamber 222 through which helium exits. The outlets 223 form a plurality of choked flow exhaust outlets in the igniter 220. The Helium from the manifold 131 as it passes through the linear sonic nozzle 221 forms a linearly extending sonic jet of helium. The linearly extending sonic jet of helium sets up resonance within the linear resonance cavity 224, which is positioned along a plane defined by the linear extension of the linear sonic nozzle 221. The resonance within the linear resonance cavity 224 heats the linear lower portion of the resonance cavity 227 to from a linearly extending hot ignition surface 225.

The primary combustion chamber 236 contains the hot surface 225, and, because of the larger hot surface, a larger quantity of hydrogen and oxygen gas can be fed to the primary chamber from gaseous oxygen inlet 228 and gaseous hydrogen inlet 229. This may eliminate the necessity of the secondary chamber 236 to increase the temperature or adjust the mixture ratio of the gases, which may be used directly to ignite a larger rocket engine combustion chamber. Alternatively the secondary combustion chamber 236 such as shown in FIGS. 1 and 2 can be used.

Although the acoustic resonance igniter has been described for use with gaseous hydrogen and oxygen, other propellants could be used, whether liquid or gas, including bipropellants and monopropellants including those described in U.S. application Ser. No. 13/396,919.

It should be understood that the resonance cavity 24, 124, 224 could be formed of a separate thin-walled structure. Such a thin-walled structure is formed of a high temperature thermally conductive material resistant to hot hydrogen, oxygen and hydroxyl vapor, such as the molybdenum alloy TZM Molybdenum ASTM B386 type 364.

It should be understood that the pintles 37, 137, 237 in the linear sonic nozzle 21, 121, 221 of the igniters 20, 120, 220 shown in FIGS. 1-3 could be omitted so long as a sonic jet of helium or other suitable low molecular weight gas is formed.

It should be understood that a larger area of the hot surface, and the resulting greater contact time of the propellant gases e.g., hydrogen and oxygen, over the hot surface can result in faster ignition or can support the ignition of larger flows of propellant gases or both.

It should be understood that the acoustic resonance igniter of this invention is most effective with a lightweight molecular monatomic gas such as helium as the resonance gas. A lightweight diatomic gas such as hydrogen is also very effective. Heavier monatomic gases such as neon, argon, and krypton or heavier diatomic gases such as nitrogen and oxygen could also be effective sources of ignition depending on the temperature needed. In this regard, although the invention has been described as using high temperature to achieve reliable and fast ignition, use of a catalytic surface, such as platinum on the heated surface of the lowermost portion of the cavity, could be used in combination with a lower temperature. Use of catalyzers may not be preferred because of the problem of catalyst contamination and the associated quality control issues of determining that an active catalyst surface is present when the igniter is called upon to function.

It should be understood that a linear pintle in the sonic nozzle is not strictly necessary, although without a linear pintle the flow rates of helium may be greater or the effectiveness of the heating in the resonance chamber may be less.

It should be understood that the essentially blind resonance cavity may have an opening from which hot gas escapes without preventing the operation of the resonance cavity described above if the opening is sufficiently small. However, such an opening is not necessary in the embodiments shown in the figures.

It is understood that the invention is not limited to the particular construction and arrangement of parts herein illustrated and described, but embraces all such modified forms thereof as come within the scope of the following claims.

I claim:

1. A hot surface acoustic resonance igniter comprising:
    a source of compressed gas having a molecular weight of about 2 to 4;
    a sonic gas nozzle defining an opening and a nozzle axis, the gas nozzle connected to the source of compressed gas;
    a structure supported with respect to the gas nozzle, wherein portions of the structure define a cavity which is configured to form a resonance cavity having an opening in the upper surface which is spaced from the gas nozzle along the nozzle axis, the structure forming a lower surface of the resonance cavity, which is arranged to be heated by gas from the source of compressed gas which is driven to resonate by being emitted from the sonic nozzle;
    a primary combustion chamber defined below the lower surface of the resonance cavity, the primary combustion chamber connected to a source of propellant;
    a secondary combustion chamber separated from the primary combustion chamber by a flow channel, the secondary combustion chamber in combustion gas receiving relation to the primary combustion chamber, the secondary combustion chamber having an elongated chamber wall along which combustion products flow; and
    portions of the combustion chamber elongated chamber wall forming secondary propellant injection ports, arranged at least in part tangential to the chamber wall to form a cooling layer of propellant along the combustion chamber wall.

2. The resonance igniter of claim 1 wherein the structure supported with respect to the gas nozzle is comprised of a support component, and mounted thereto a resonance cavity forming structure.

3. The resonance igniter of claim 1 wherein the source of compressed gas is a source of helium.

4. The resonance igniter of claim 3 wherein the source of helium is a source of 200 to 620 psi helium.

5. The resonance igniter of claim 1 further comprising an annular manifold connected to the source of propellant, the annular manifold surrounding at least part of the secondary combustion chamber elongated chamber wall along which combustion products flow;
    wherein the secondary propellant injection ports connect the annular manifold to the combustion chamber.

6. The resonance igniter of claim 5 further comprising a passageway which connects the annular manifold to an orifice which feeds into the primary combustion chamber.

7. The resonance igniter of claim 5 wherein the secondary combustion chamber elongated chamber wall has portions defining a cylinder having an inner cylindrical wall and a cylinder axis; and
    wherein the secondary propellant injection ports are positioned in the portions defining the cylinder, and the secondary propellant injection ports are at least partially tangent to the inner cylindrical wall.

8. The resonance igniter of claim 7 wherein the secondary propellant injection ports are tangent to the inner cylindrical wall angled downwardly at about a 45° angle with respect to the cylinder axis.

9. The resonance igniter of claim 1 wherein the primary combustion chamber is connected to two sources of propellant comprising an oxidizer source and a fuel source.

10. The resonance igniter of claim 9 wherein the oxidizer source is a source of gaseous oxygen at a selected pressure and the fuel source is a source of gaseous hydrogen at a selected pressure.

11. The resonance igniter of claim 10 wherein the source of gaseous oxygen is connected through a first orifice of a first selected area to the primary combustion chamber, and the source of gaseous hydrogen is connected through a second orifice of a second selected area to the primary combustion chamber, and wherein the first orifice selected area, the gaseous oxygen source pressure, the second orifice selected area, and the gaseous hydrogen source pressure, are selected so that a mixture ratio of weight of oxygen to weight of hydrogen in the primary combustion chamber is 30-40 to 1, and that when the gaseous oxygen and the gaseous hydrogen are ignited the mixture ratio of weight of oxygen to weight of hydrogen increases.

12. The resonance igniter of claim 1 further comprising a pintle extending into the nozzle opening.

13. A hot surface acoustic linear resonance igniter comprising:
   a source of compressed hydrogen or helium gas;
   a linearly extending sonic gas nozzle defining a linearly extending nozzle opening, and a nozzle plane centered on the linearly extending opening of the sonic gas nozzle;
   wherein the gas nozzle is connected to the source of compressed hydrogen or helium gas, to form a linear gas jet which extends along the nozzle plane;
   a structure, portions of the structure forming an upper surface, a linearly extending resonance opening and a linearly extending resonance cavity extending away from the linear opening, the linear opening supported spaced from the linearly extending sonic gas nozzle so that the linear opening and the linearly extending resonance cavity extend linearly in the nozzle plane;
   wherein the structure has a lower linear surface external to the resonance cavity and opposite the resonance cavity, which lower surface is arranged to be heated by a resonance produced by the linear gas jet emitted by the linearly extending sonic gas nozzle; and
   a combustion chamber defined below the lower surface of the resonance cavity, the combustion chamber connected to a source of propellant.

14. The resonance igniter of claim 13 wherein the nozzle opening, the resonance opening and the resonance cavity extend linearly about 0.25 to 1.0 inches.

15. The resonance igniter of claim 13 further comprising a linearly extending pintle extending into the nozzle opening.

16. The resonance igniter of claim 15 wherein the source of compressed hydrogen or helium gas is connected to a manifold with a plurality of inlets which connect the source of hydrogen or helium compressed gas to the linearly extending sonic gas nozzle.

17. The resonance igniter of claim 13 further comprising:
   a secondary combustion chamber separated from the combustion chamber by a flow channel, the secondary combustion chamber in combustion gas receiving relation to the combustion chamber, the secondary combustion chamber having an elongated chamber wall along which combustion products flow; and
   portions of the elongated chamber wall forming secondary propellant injection ports, arranged at least in part tangential to the combustion chamber wall to form a cooling layer of propellant along the combustion chamber wall.

18. The resonance igniter of claim 13 wherein the combustion chamber is connected to two sources of propellant comprising: an oxidizer source and a fuel source.

19. The resonance igniter of claim 18 wherein the oxidizer source is a source of gaseous oxygen at a selected pressure and the fuel source is a source of gaseous hydrogen at a selected pressure.

20. The resonance igniter of claim 19 wherein the source of gaseous oxygen is connected through a first orifice of a first selected area to the combustion chamber, and the source of gaseous hydrogen is connected through a second orifice of a second selected area to the combustion chamber, and wherein: the first orifice selected area, the gaseous oxygen source pressure, the second orifice selected area, and the gaseous hydrogen source pressure, are selected so that a mixture ratio of weight of oxygen to weight of hydrogen in the combustion chamber is 30-10 to 1, and that when the gaseous oxygen and the gaseous hydrogen are ignited the mixture ratio of weight of oxygen to weight of hydrogen increases.

\* \* \* \* \*

UNITED STATES PATENT AND TRADEMARK OFFICE
CERTIFICATE OF CORRECTION

| | | |
|---|---|---|
| PATENT NO. | : 9,476,399 B1 | Page 1 of 1 |
| APPLICATION NO. | : 13/894919 | |
| DATED | : October 25, 2016 | |
| INVENTOR(S) | : Scott M. Munson | |

It is certified that error appears in the above-identified patent and that said Letters Patent is hereby corrected as shown below:

In the Claims

Column 10, Line 34, "the combustion chamber is 30-10 to 1" should be -- the combustion chamber is 30-40 to 1 --.

Signed and Sealed this
Third Day of January, 2017

Michelle K. Lee
*Director of the United States Patent and Trademark Office*